May 12, 1936.  J. A. FORTES  2,040,648

EGG HOLDER

Filed May 24, 1935

INVENTOR:
JAMES A. FORTES
BY Bruce A. Elliott
ATTORNEY

Patented May 12, 1936

2,040,648

UNITED STATES PATENT OFFICE 2,040,648

EGG HOLDER

James A. Fortes, St. Louis, Mo.

Application May 24, 1935, Serial No. 23,149

11 Claims. (Cl. 53—1)

This invention relates to certain new and useful improvements in culinary utensils and particularly to a device to be employed in boiling eggs.

The invention has for its general object to provide a device of this character which shall be characterized by great stability of structure so that, with normal use, there will be no liability of any of the parts of the device becoming loose and turning, or being otherwise subject to movement.

The invention comprises a central standard or rod, having a supporting base mounted on its lower end, to which is secured a series of egg holders in the form of coiled wire baskets, each of which has the wire at its upper end extending outward in the form of an arm which is firmly secured to said base to extend radially therefrom. The lower end of the base projects slightly below the plane of the lower end of the baskets, so that the device with the eggs therein may be placed on a table, plate, or any other flat surface, and rest on said support with the bottoms of the baskets out of contact with said surface.

The chief characteristics of the invention reside in the novel construction of parts I employ, which enables me to assemble and secure the parts of the utensil in such manner as to present a rigid structure and at the same time promote economy in manufacture and the production of a utensil of this nature which is pleasing or ornamental in appearance.

In this latter regard, it is to be noted that some housewives prefer to immerse the eggs to be served in boiling water while at the table, so that during the time consumed in eating fruit or cereal, the eggs will be sufficiently cooked, and may be served, if desired, by passing the utensil with the eggs therein from hand to hand, so that each member of the family may remove one or more eggs therefrom. In such use it would, of course, be highly desirable that the utensil should not have a cheap or unattractive appearance. The main use of the device, however, will undoubtedly occur in the kitchen.

While in the present instance I have shown the device as comprising four baskets, according to the number in the household, the device could be constructed with two baskets, or with more than four, up to say, twelve. Where a larger number of baskets than four are employed, and especially if eight or twelve baskets are used, such larger devices involve some differences in construction, which will be embodied in other applications which I contemplate filing.

The central standard of the device is provided at its stop with a ring or other form of handle, which not only enables the device to be lowered in the receptacle containing the water and to be lifted out of the same, but permits the device with the eggs in it to be suspended from a hook to permit the eggs to cool off. Or the device may be set to one side on its supporting base. Thus, where eggs are to be hard boiled, and thereafter cooled and sliced, the utensil can be removed from the water, after the eggs have boiled a sufficient length of time, and either suspended while the eggs are cooling by supporting the same on a hook from the ring or handle; or, where haste is required, by setting the device in a refrigerator. In either case, the device permits ready manipulation with practically no danger of the eggs falling, or being accidentally forced out of, any of the baskets, as the bottoms of the latter are at all times out of contact with any surface. It will be seen, of course, that if the baskets themselves were used for supporting the utensil, if the device were not placed easily on the table or other support, there would be danger of the eggs being thrown out of the baskets by reason of the weight of the device with eggs therein compressing the coils so that the baskets would become too shallow to hold the eggs.

My invention and the manner of constructing and assembling the same is illustrated in the accompanying drawing, in which,—

Figure 1:
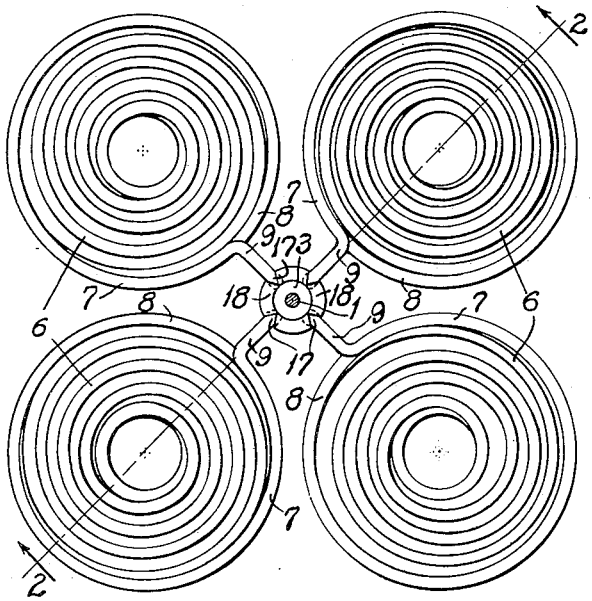
Figure 1 is a plan view of my improved egg holder, the center rod being shown in section.

Referring now to the drawing, the numeral I indicates a central rod, preferably of wire, and bent at its upper end to form a ring, 2, constituting a handle. Mounted on the lower end of the rod I are a plurality of disks, 3, which are centrally apertured to permit the rod I to be passed through them, and the lower end of which is then riveted or up-set, as at 4, to prevent the washers from sliding off the rod. I have shown three washers mounted on the lower end of rod I, and each of these washers is provided with four equally spaced peripheral recesses, 5, which are adapted to align with each other so as to form four continuous grooves extending throughout the height of the assembled disks. When so assembled, the disks constitute a plug, and will hereafter be so referred to. That is to say, the use of a plurality of disks with aligning recesses instead of a solid plug of the height of said disks, is merely an exigency of manufacture. This may be explained by stating that the disks may be cheaply and rapidly stamped out and provided with the peripheral recesses 5, in one operation; whereas, if a solid plug were employed, the most economical manner of producing the same would be by cutting four grooves in a length of rod of the diameter of the plug and then cutting the rod into plugs of the desired height. Such machine operation is more expensive than the stamping operation, and besides it has been found practically impossible, without excessive cost, to produce grooves in the plugs of uniform size; and this is necessary to prevent any play of the arms supporting the egg baskets, as will later appear. However, my invention contemplates the employment of a solid plug; and as, in the assembled device, the three disks are held in firm fixed relation and in effect constitute a plug, I will, as stated, use this term in the specification and claims, where necessary in adequately describing the invention, in addition to making specific reference to the use of a plurality of disks.

The numerals 6 indicate four similar coiled wire baskets or egg holders, a description of one of which will therefore suffice. Each of the baskets 6 comprises a spirally wound length of wire, the spirals being superposed upon, but separated from each other, except at the top of the basket, where the wire 7 of the upper spiral is extended in a substantially horizontal plane to come in contact with the upper coil, 8, at the inner side of the latter, at which point of contact the wire 7 and coil 8 are united as by solder, or preferably welding, as indicated at 8a, in Figures 2 and 3. Each wire 7 is furthermore continued in a straight line inward or toward the rod 1 for a given distance beyond the inner side of the coil to provide an arm 9, which is bent downward at right angles as indicated at 9a, the lower ends of the downwardly projecting portion 9a being spread slightly in opposite directions, as by peening opposite sides of the wire, as indicated at 10, for a purpose to be presently described.

Figure 2:
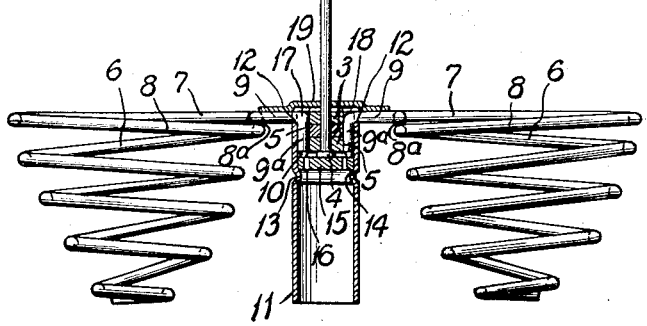
Figure 2 is a vertical sectional view on the line 2—2 of Figure 1.
Figure 2:
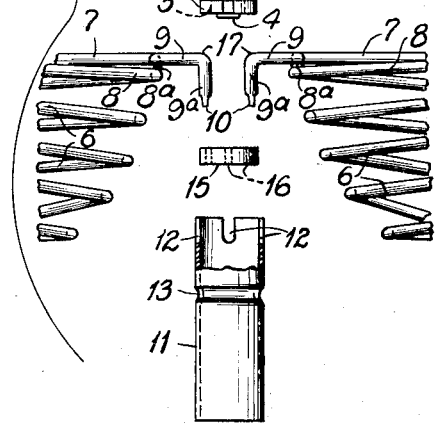

The numeral 11 indicates a combined holder and support, in and on which the parts of my device are assembled and rigidly secured. This combined support and holder is in the form, in the present embodiment of my invention, of a tubular member slightly longer than the depth of the baskets 6, which member is provided on its upper end with four oppositely disposed slots 12, each of which is adapted to receive the arm 9 of a wire 7 in the assembled device. At a suitable distance below its upper end the tubular member 11 is provided in a well known way with a circular depression, 13, Figure 3, which forms a circular shoulder, 14, on the interior of the tubular member, as shown in Figure 2.

Figure 4:
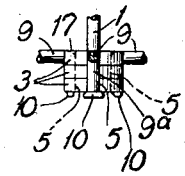
Figure 4 is a detail view illustrating the manner of mounting the arm of a basket in the retaining plug.

In assembling the parts of the device as thus far described, I first insert in the upper end of the tubular member 11 to rest on the shoulder 14 a washer, 15, which may be perforated, as indicated at 16, to permit the escape of water from the upper part of said member. I next place the downwardly projecting part 9a of the arm 7 of each basket in one of the grooves 5 of the washers, or plug 3, which have or has previously been mounted on the rod 1, and then insert the plug and wires in the upper end of the tubular member 11, forcing the arm 9 of the wire 7 into a corresponding groove 12 of the tubular member. The length of the downwardly projecting portion 9a of wire 7 is such that when this part is inserted in a groove 5, the laterally enlarged end 10 of said part will project beyond and engage the under side of the plug, as shown in Figure 4, thus preventing any upward movement of the arm 9 relative to said plug. When placed in the tubular member 11 the bottom of the projecting ends 10 will rest upon the upper surface of the washer 15. The four segments of the tubular member between the slots 12 are then swaged or turned over inwardly by a suitable implement, which causes said segments to embrace and extend over the shoulder, 17, of each arm 9 of wire 7, as clearly shown in Figure 1, where the turned over segments are indicated by the numerals 18. This forces the ends 10 of wire 9 into firm contact with the washer 15, and the plug 3 into firm engagement with the enlarged ends 10, it being understood that when the segments 18 are swaged or turned inward their outer ends are thereby brought into engagement with the upper side of plug 3, or which is the same thing, with the upper side of the uppermost washer 3.

Figure 3:
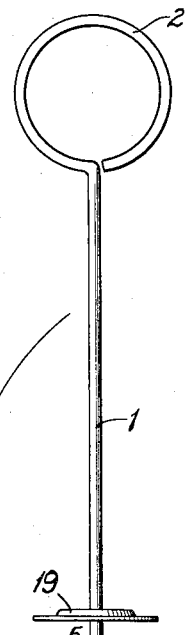
Figure 3 is a view in elevation of the complete utensil but showing the parts of the device disconnected but in position to be assembled and the upper part of the tubular support being sectioned.

Prior to mounting the washers or plug 3 on the rod 1, a centrally apertured cover plate, 19, is placed on said rod, as shown by Figure 3, and after the parts have been assembled and secured in the tubular support 11, the coverplate 19 is then forced downward into position on top of the tubular member. The cover plate is of a diameter to extend outward over the arms 9 of the four baskets, and when pressed downward upon the same tend to stabilize the structure. The said cover plate may be secured in position in any desired way, but preferably this is done by causing it to firmly frictionally engage the rod 1.

It will be understood that all of the parts of the device assembled in the tubular holder have a tight fit; that is to say, the washer 15, and plug 3 fit snugly within the tubular member 11, the projections 9a have an equally snug fit within the grooves 5 of plug 3, and the arms 9 fit tightly within the slots 12. Thus, when the sections 18 at the upper end of the tubular member are turned over to firmly bind the arms 9 in position as well as to force their lower ends firmly against the washer 15 and the bottom of the plug 3 firmly against the shoulders provided by the enlarged ends 10, all of the parts of the assembly will be held in firm engagement and there can be no relative movement of any kind between them.

It will be noted that with the eggs supported in the baskets 6 they will be maintained out of contact with each other, and that there will be no liability of the eggs striking against each other and having their shells broken, due to movement thereof caused by the commotion of the boiling water.

While I have described my improved device as adapted particularly for use in boiling eggs, it may be equally well used for boiling onions, potatoes, or the like, and perhaps other uses will suggest themselves to those skilled in the art.

I claim:

1. A culinary utensil comprising a central, self-contained supporting base, a series of holders rigidly supported directly thereby, and an independent handle secured in said supporting base and projecting above the same.

2. A culinary utensil comprising a tubular, self-contained supporting base, a series of equidistant holders rigidly mounted therein and an independent handle secured in said base and projecting above the same.

3. A culinary utensil comprising a central, self-contained supporting base, a series of holders rigidly secured therein and being less in height than the height of said supporting base and an independent handle secured in said supporting base at a distance from its bottom and projecting above the same.

4. A culinary utensil comprising a central tubular member affording a base for the utensil, a series of holders having radial arms rigidly secured in and projecting radially from the upper end of said tubular member and a rod secured at its lower end in said tubular member and provided at its upper end with a handle.

5. A culinary utensil comprising a tubular member, a plug having a plurality of vertical circumferential grooves secured in the upper end of said tubular member, a series of holders each of which has a radial arm provided with a downward projection fitting in one of the grooves of said plug, means for securing said arms in the plug and a rod secured at its lower end centrally in said plug and projecting above the same and provided with a handle at its upper end.

6. A culinary utensil comprising a central tubular supporting member provided with an interior stop, a plug having a plurality of vertical circumferential grooves mounted on said stop, a handle member secured in said plug and projecting above the same, a series of holders each of which has a radial arm provided with a downward projection fitting in a groove of said plug and means for securing said plug and projections in firm engagement with said stop.

7. An egg holder for use in boiling eggs comprising a central tubular support, a washer fixed on the inside of the same, a plug having a series of vertical circumferential grooves mounted on said washer, a handle member secured in said plug and projecting above the same, a series of coiled wire baskets each of which has the wire of its upper coil projecting radially and provided with a downward extension fitted in a groove of said plug, and means for securing said plug and projections in firm fixed relation to said washer and the arms in firm fixed relation to said tubular member.

8. An egg holder for use in boiling eggs comprising a central tubular support provided with equidistant slots in its upper end, a washer fixed on the inside of the same, a plug having a series of vertical circumferential grooves mounted on said washer, a handle member secured in said plug and projecting above the same, a series of coiled wire baskets each of which has the wire of its upper coil projecting radially and fitted in one of the slots of said support and provided with a downward extension fitted in a groove of said plug, the sections of said supports between said slots being bent inward whereby to closely embrace said radial projections and to bear against the upper side of said plug to press the bottom of said plug into firm engagement with said washer.

9. An egg holder for use in boiling eggs comprising a central tubular support provided in its upper end with a series of equidistant slots, a washer fixed on the inside of the same in snug engagement with the wall thereof, a plug fitting snugly in said tubular support, mounted on said washer and provided with a series of equidistant vertical circumferential grooves, a handle member fixedly secured in said plug and projecting a considerable distance above the same, a series of coiled wire baskets each of which has the wire of its upper coil continued in the form of a radial arm fitted in one of the slots of said support and provided with a downward extension fitted in a groove of said plug, the sections of the support between said slots being turned inward to firmly engage about and over said arms and to bear against the upper side of said plug and force it into firm engagement with said washer.

10. An egg holder for use in boiling eggs comprising a central tubular support provided in its upper end with a series of equidistant slots, a washer fixed on the inside of said support in snug engagement with the wall thereof, a plug fitted snugly within said support, mounted on said washer and provided around its periphery with a series of vertical grooves coinciding with the slots in said tubular support, a handle member secured in said plug and projecting a considerable distance above the same, a series of coiled wire baskets each of which has the wire of its upper coil extended outwardly to provide a radial arm fitted in one of the slots of said support and provided with a downward extension fitted in a groove of said plug, each of said downward extensions projecting below the bottom of the plug and having its lower end enlarged to engage the bottom of the plug on either side of its slot, the sections of the tubular support between said slots being turned inward to firmly engage between them the said radial arms and to force said plug downward to hold the same and the enlarged ends of said downward projections in firm fixed relation to said washer.

11. An egg holder for use in boiling eggs comprising a central tubular support provided with equidistant slots in its upper end, a washer fixed on the inside of the same and snugly engaging the wall of the support, a plug fitted snugly within said support, mounted on said washer and provided around its periphery with a series of vertical grooves coinciding with the slots of said support, a handle member fixedly secured in said plug and projecting a considerable distance above the same, a series of coiled wire baskets each of which has the wire of its upper coil extended to provide a radial arm fitted in one of said slots and provided with a downward extension fitted in a groove of said plug, the sections of the tubular support between said slots being turned inward to firmly engage about and over said radial arms and to force said plug downward into firm fixed relation with said washer, and a cover plate secured on said handle member in engagement with said radial arms.

JAMES A. FORTES.